United States Patent Office 3,658,912
Patented Apr. 25, 1972

3,658,912
STABILISATION OF AQUEOUS FORMALDEHYDE SOLUTIONS
Raimund Wambach, Wulf von Bonin, and Hermann Wolz, Leverkusen, Germany, assignors to Farbenfabriken Bayer Aktiengesellshaft, Leverkusen, Germany
No Drawing. Filed Mar. 9, 1966, Ser. No. 532,887
Claims priority, application Germany, Apr. 15, 1965, F 45,834
Int. Cl. C07c 47/04
U.S. Cl. 260—606
10 Claims

ABSTRACT OF THE DISCLOSURE

A method of improving stabilization of aqueous formaldehyde solutions by admixing therewith a graft polymer of a vinyl alcohol ester grafted to a poly acetal of formaldehyde with a glycol or the corresponding saponification product thereof; heating the mixture at 60–120° C. for 3–20 hours.

---

The invention relates to the stabilisation of aqueous formaldehyde solutions by the addition of graft polymers, which are prepared from esters of vinyl alcohol and polyacetals of formaldehyde with diethylene or triethylene glycol, and their alkaline and acid hydrolysis products.

It is known that in aqueous solution, formaldehyde slowly changes into a water-insoluble form of higher molecular weight. This is indicated by the solution becoming cloudy (often with the formation of deposits), and occurs particularly at low temperatures and at relatively high concentrations. However, other factors, such as the pH value of the formaldehyde solution, also influence the speed of formation of the higher molecular weight compounds.

Both from the point of view of transportation costs and that of saving energy and reaction space in the further processing of formaldehyde, it is desirable not to allow the formaldehyde concentrations of the solutions to fall below 30% by weight. Recently it has become of interest to market solutions with concentrations of 37% by weight, 40% by weight and higher.

The higher concentrations are maintained either by keeping the formaldehyde solutions at an elevated temperature, the amount depending upon formaldehyde concentration, until they are subjected to further processing, or by adding substances which inhibit the tendency of formaldehyde to polymerise. Such substances are generally referred to as stabilisers. For example, it is known that methyl alcohol or urea and similar compounds may be used as stabilisers. It is, however, a great disadvantage of such compounds that, again depending on the temperature, they have to be added in quantities of 3 to 15 parts per 100 parts of the formaldehyde solution. Such amounts of stabiliser often prove to be a nuisance with respect to further processing. They cannot be recovered and also make the formaldehyde solution more expensive.

Other stabilisers include, for example, melamine, triazine derivatives and other nitrogenous products such as betains or acid amides, which are added in small quantities, often far below 1% of the formaldehyde solution. Formaldehyde solutions stabilised in this way contain nitrogen and are frequently not sufficiently stabile; the solutions stabilised with such nitrogen compounds can only be stored at relatively high temperatures. Moreover, cellulose derivatives such as methyl cellulose or hydroxypropylmethyl cellulose, as well as pectins, gelatins, carragheen and polyvinyl alcohol and other polyhydric alcohols and the ethers, acetals and esters of these polyhydric alcohols can also be used for stabilising formaldehyde solutions. Such substances are also employed in combination with ultra-violet rays for the purpose of stabilising formaldehyde solutions. These stabilisers, however, are not satisfactory and are also insufficiently soluble in formaldehyde solutions. Furthermore, some of the more important of the above compounds inhibit further processing of the formaldehyde, despite their low concentrations.

It is an object of this invention to obtain formaldehyde solutions such as aqueous formaldehyde solutions which are cheaply and usefully stabilised against polymerisation.

These objects are achieved if graft polymers consisting of esters of vinyl alcohol with polyacetals of formaldehyde and diethylene or triethylene glycol, and more especially the compounds formed by the acid and basic hydrolysis of the graft polymers are used as stabilisers for formaldehyde solutions, and the solutions are thereafter heated for 3 to 20 hours, advantageously for 10 to 16 hours, to temperatures above 60° C., particularly 80° C. to 120° C. The formaldehyde solutions thereby obtained are characterised not only by an excellent stability, but can also be further processed without any difficulty to produce melamine, phenol, ketone, and urea resins.

The preferred formaldehyde content of the solutions is 35 to 45% by weight. Solutions of a lower formaldehyde content, however, may be stabilised as well, though those solutions are sometimes inherently stable. Higher formaldehyde concentration, up to about 60% by weight may be used, when increased amounts (within the given limits) of stabiliser are applied.

Furthermore, the stabilisers are free from nitrogen and have, for the most part, good solubility in water.

The stabilisers are used in amounts of 0.0001% to 1% by weight, based on the total solution, and advantageously 0.001% to 0.2% by weight.

The graft polymers to be used as stabilisers according to the present invention are employed either directly or in hydrolysed form and are produced by subjecting vinyl esters such as, for example, vinyl acetate or vinyl propionate, optionally admixed with other monomers, which can be polymerised by radicals to radical polymerisation in the presence of formaldehyde-diethylene glycol or formaldehyde-triethylene glycol polyacetals.

The compounds and the method of their production are described in German Auslegeschrift No. 1,161,423.

Preferred graft polymers are those produced from vinyl acetate and diethylene glycol formaldehyde polyacetal, and the amount of vinyl acetate therein may preferably vary from 500 to 50 parts by weight per 100 parts of diethylene glycol formaldehyde polyacetal.

The graft polymers obtainable in this way may be introduced directly as stabilisers or can be further reacted for example, with alkali or acid or a combined alkaline and acid hydrolysis or saponification. For this purpose, the graft polymer is preferably converted in dissolved form.

The solvents used are preferably water or solvents which are miscible with water, such as methanol, or solvent mixtures.

The alkali saponification or hydrolysis can be effected in a conventional manner by aqueous or alcoholic alkalis, alkaline earths, amines or alcoholates or by an aqueous ammonia solution at temperatures between 10° C. and 150° C. It is, however, preferred to use an aqueous or alcoholic sodium hydroxide or potassium hydroxide solution and to use sodium methylate when working in anhydrous form.

The acid hydrolysis is conducted in the same media, especially with hydrochloric acid or sulphuric acid, although other organic or inorganic acids are suitable, e.g. formic acid, chloroacetic acid, toluene sulphonic acid, perchloric acid, phosphoric acids or hydrobromic acid.

With the combined alkali and acid hydrolysis, the polyvinyl ester fraction of the graft polymer is preferably initially subjected to saponification in an alkaline medium and thereafter the polyacetal fraction of the graft polymer is hydrolysed in an acid medium. In all cases, the degree of saponification or hydrolysis of both the polyvinyl ester fraction and the polyacetal fraction of the graft polymer can be varied from 0.5% to 100% by the choice of suitable reaction conditions. All reaction products of the graft polymers which are obtained in this way are more or less strongly effective as stabilisers.

PRODUCTION OF THE STABILISERS

Stabiliser 1

500 parts of diethylene glycol-formaldehyde-polyacetal OH number 96, are heated to 120° C. The air is then displaced by $N_2$ and a solution of 2 parts of benzoyl peroxide and 2 parts of azodiisobutyronitrile in 500 parts of vinyl acetate is introduced dropwise in 2–6 hours. After the dropwise addition, stirring is continued for another 3–8 hours. Unreacted vinyl acetate is then removed from the reaction mixture by blowing with steam at 100° C. and 500 parts of water are added to the resulting mixture.

Stabiliser 2

Initially, the procedure is analogous to that used for stabiliser 1, but 750 parts of the polyacetal are introduced. 175 parts of the water-containing reaction mixture are then mixed with a solution of 10 parts of NaOH in 175 parts of $H_2O$ and vigorous stirring takes place for 16 hours at 80° C. Thereafter, the reaction mixture is dried in a vacuum chamber at 60° C., a waxy product being obtained. The proportion of sodium acetate which is formed by the saponification does not have to be removed.

Stabiliser 3

Initially, the procedure adopted in the preparation of stabiliser 2 is followed, with the difference that a solution of 10 parts of NaOH in 175 parts of methanol is used for the saponification. 100 parts of the saponification product is thus obtained are dissolved in 200 parts of 50% methanol and adjusted with concentrated HCl to pH 1. The mixture is then stirred at 80° C.–90° C. for 10 hours. It is thereafter dried in vacuo at 80° C., a greasy wax being obtained as the final product.

Stabiliser 4

750 parts of diethylene glycol polyacetal are brought to 120° C., and then, in an $N_2$ atmosphere, a solution of 2 parts of azodiisobutyronitrile and 3 parts of benzoyl peroxide in 500 parts of vinyl acetate is introduced dropwise over a period of 5 hours. Stirring is continued for another 5 hours and then 500 parts of methanol and 200 parts of 10% HCl ($H_2SO_4$) are added. The mixture is then boiled for 20 hours under reflux. Thereafter, excess methanol and HCl passing over therewith are driven off at a bath temperature of 90° C. under normal pressure. The remaining reaction solution can be used directly as a stabiliser. It still contains small quantities of acid and also some methanol.

EXAMPLE 1

Stabiliser 1 is dissolved in water to form a 1% solution. This aqueous stabiliser solution is added to 38%–43% by weight of formaldehyde solution, which is at a temperature of about 50° C.–90° C. (free from methanol, pH about 3.2) in such a quantity, that the concentration of the stabiliser amounts to about 0.01% by weight, based on the total aqueous solution. The formaldehyde concentration is then adjusted exactly to 37% by weight, and the formaldehyde solution is heated for 16 hours at 90° C. After cooling to testing temperature, the stabilising effect is determined by establishing the time during which the solution still remains completely clear at the testing temperature.

Testing temperature: 3° C. to 4° C.

Stabiliser concentration,
percent by wt.:                            Stability, hrs.
    0.01 _____ 50

EXAMPLE 2

First of all, a 1% aqueous solution is prepared from stabiliser 2, and this solution is then added to an approximately 38% by weight formaldehyde solution (free from methanol, pH about 3.1) in a sufficient quantity for the concentration of the stabiliser to be about 0.01% by weight or 0.001% by weight, based on the total solution. The solutions are heated for 14 hours at 90° C. The testing method corresponds to that described in Example 1.

Testing temperature: 3° C. to 4° C. Formaldehyde concentration 36.9%.

Stabiliser concentration,
percent by wt.:                            Stability, hrs.
    0.01 _____ 79
    0.001 _____ about 40

Stability of the unstabilised 37% by weight formaldehyde solution: about 40 minutes Stability of a 37% by weight formaldehyde solution stabilised with polyvinyl alcohol:

0.01% by weight—about 45 hours.

EXAMPLE 3

The importance of the after-treatment using heat is indicated in this example.

A 37% by weight formaldehyde solution, to which an aqueous solution of the stabilizer 2 has been added in accordance with the data of Example 2, is heated for different periods of time at 75° C. or 90° C. The stability values can be seen from the following table.

Testing temperature: 3° C. to 4° C.

| Percent by weight | | Heat treatment | | |
| --- | --- | --- | --- | --- |
| Stabiliser concentration | Formaldehyde concentration | Temp., °C. | Time, hr. | Stability, hr. |
| 0.01 | 37 | 90 | 16 | 79 |
| 0.01 | 37 | 90 | 10 | 36 |
| 0.01 | 37 | 90 | 4 | 2 |
| 0.01 | 37 | 60 | 16 | 2 |

EXAMPLE 4

First of all, a 1% aqueous solution is prepared from stabilizer 3 and is added to 38–39% by weight formaldehyde (methanol content 1% by weight, pH 3.0) in such a quantity that the stabilizer concentration is 0.003%. After exact adjustment of the formaldehyde concentration to 37% by weight, the formaldehyde solution is heated for 20 hours at 80° C. The cold stability of the formaldehyde solution was established in the usual way after cooling to the testing temperature of 3° C. to 4° C.

Stabilizer concentration
percent:                                     Stability, hrs.
    0.003 _____ 70

EXAMPLE 5

Stabilizer 2 is dissolved in water to form a 1% solution. This solution is added to an approximately 30–31% by weight formaldehyde solution (0% by weight methanol, pH 3.1) in such a quantity that the concentration of the stabiliser is 0.003% by weight, based on the total solution. After the formaldehyde had been adjusted to 30% by weight and heated for 16 hours at 90° C., the testing was carried out in accordance with the data of Example 1.

Testing temperature: —9° C. to —12° C.

Stabiliser concentration,
percent by wt.: Stability
0.003 _____ Clear for more than 1 month
(experiment then stopped).

Stability of the unstabilised 30% by weight formaldehyde solution:

Testing temperature: Stability, hrs.
2° C. to —5° C. _____ 34

EXAMPLE 6

Stabilizer 2 is dissolved in water to give a 1% solution. This solution is then mixed with an approximately 42% by weight formaldehyde solution (methanol content 0.1% by weight, pH 3.0) in such a quantity that the stabiliser is present in a concentration of 0.01% by weight in formaldehyde, which is finally adjusted to 40% by weight. Thereafter, the formaldehyde solution was kept for another 16 hours at 90° C. The solution was tested in the usual manner.

Treating temperature: 15° C.

Stabiliser concentration,
percent by wt.: Stability, hrs.
0.01 _____ 70

Unstabilised 40% by weight formaldehyde solution: 3 hours.

EXAMPLE 7

A 1% aqueous solution of the stabilizer 4 is added to an approximately 39% by weight formaldehyde solution (methanol content 0.2% by weight pH about 3.3) in such a quantity that the concentration of the stabiliser is about 0.01% or 0.003% by weight, based on the total solution. After the formaldehyde concentration had been adjusted to 37% by weight, the solutions were heated for 14 hours at 80° C. and after cooling they were finally tested in the manner described in Example 1.

Testing temperature: 3° C. to 4° C.

Stabiliser concentration,
percent by wt.: Stability, hrs.
0.01 _____ 82
0.003 _____ 85

We claim:
1. Method for stabilising aqueous formaldehyde solutions which comprises adding to the formaldehyde solutions a stabilising amount of a member of the group consisting of
    (1) graft polymers of vinyl acetate or vinyl propionate grafted to a polyacetal of formaldehyde with a member selected from the group consisting of diethylene glycol and triethylene glycol, and
    (2) reaction mixtures obtained by saponifying said graft polymers and heating the resulting composition to a temperature of about 60–120° C. for about 3–20 hours.
2. Method according to claim 1, wherein the aqueous formaldehyde solution contains about 30–45% by weight of formaldehyde.
3. Method according to claim 1, wherein the graft polymer is vinylacetate polymerised in the presence of diethylene glycol formaldehyde polyacetal.
4. Method according to claim 1, wherein the graft polymer is a hydrolysed vinylacetate polymerised in the presence of diethylene glycol formaldehyde polyacetal.
5. Method according to claim 1, wherein the graft polymer is obtained from about 500–50 parts by weight of vinylacetate and about 100 parts of diethylene glycol formaldehyde polyacetal.
6. Method according to claim 1, wherein the graft polymer is utilized in the form of an aqueous solution.
7. The method of claim 1 wherein the graft polymer is employed in a concentration of about .0001%–1% by weight of solution.
8. Method for stabilizing an aqueous formaldehyde solution, which comprises adding to the solution a stabilizing amount of a graft polymer of (a) an ester of vinyl alcohol and acetic or propionic acid grafted to (b) a polyacetal of formaldehyde with a member selected from the group consisting of diethylene glycol and triethylene glycol; and heating the resulting mixture to a temperature of about 60°–120° C. for about 3–20 hours.
9. A composition of matter obtained by adding to an aqueous formaldehyde solution a stabilizing amount of a member of the group consisting of
    (1) graft polymers of vinyl acetate or vinyl propionate grafted to a polyacetal of formaldehyde with a member of the group consisting of diethylene glycol and triethylene glycol and
    (2) reaction mixtures obtained by saponifying said graft polymers and heating the resulting composition to a temperature of about 60–120° C. for about 3–20 hours.
10. A composition of matter according to claim 9 comprising about 30–45% by weight of formaldehyde, 0.0001–1% by weight of graft polymer of 500–50 parts by weight of vinylacetate and 100 parts by weight of diethylene glycol formaldehyde polyacetal, or a hydrolysis product thereof, the remainder being essentially water.

References Cited

UNITED STATES PATENTS

| | | | |
|---|---|---|---|
| 3,249,654 | 4/1966 | Von Bonin et al. | 260—874 |
| 3,218,281 | 11/1965 | Rees | 260—874 |
| 3,137,736 | 6/1964 | Prinz et al. | 260—606 |

FOREIGN PATENTS

| | | | |
|---|---|---|---|
| 968,762 | 9/1964 | Great Britain | 260—606 |
| 15,106 | 7/1964 | Japan | 260—606 |
| 942,459 | 4/1963 | Great Britain | 260—874 |
| 942,458 | 4/1963 | Great Britain | 260—844 |
| 374,109 | 6/1962 | Japan | 260—606 |

OTHER REFERENCES

The Merck Index, 7th edition, page 834, 1960.

BERNARD HELFIN, Primary Examiner

R. H. LILES, Assistant Examiner